United States Patent [19]

Evans

[11] Patent Number: 5,048,696

[45] Date of Patent: Sep. 17, 1991

[54] CONVEYED ITEM DIVIDER/SORTER

[75] Inventor: Donald E. Evans, Hilliard, Ohio

[73] Assignee: Don Evans & Associates, Inc., Hilliard, Ohio

[21] Appl. No.: 575,917

[22] Filed: Aug. 31, 1990

[51] Int. Cl.$^5$ .......................... B07C 5/36; B65G 47/91
[52] U.S. Cl. .................................... 209/552; 198/370; 198/438; 209/643; 209/905
[58] Field of Search ............... 209/535, 536, 552, 606, 209/643, 656, 629, 905, 925; 198/370, 438, 689.1

[56] References Cited

U.S. PATENT DOCUMENTS

| | | | |
|---|---|---|---|
| 2,941,653 | 6/1960 | Kriemelmeyer, Jr. | 198/438 |
| 3,035,695 | 5/1962 | Buchwald et al. | 209/643 |
| 3,099,360 | 7/1963 | Petersen et al. | 198/689.1 X |
| 3,140,780 | 7/1964 | Richert et al. | 198/438 |
| 3,168,958 | 2/1965 | Grossi | 198/689.1 X |
| 3,477,558 | 11/1969 | Fleischauer | 198/689.1 |
| 3,523,707 | 8/1970 | Roth . | |
| 3,721,340 | 3/1973 | Kruse et al. | 209/643 X |
| 3,918,586 | 11/1975 | Tyler et al. | 209/643 X |
| 4,096,941 | 6/1978 | Tokuno | 198/689.1 |
| 4,136,781 | 1/1979 | Perry et al. | 209/552 |
| 4,146,467 | 3/1979 | Sauer et al. | 209/643 |
| 4,362,461 | 12/1982 | Cathers . | |
| 4,457,420 | 7/1984 | Ducloux | 198/438 X |
| 4,560,060 | 12/1985 | Lenhart | 209/643 X |
| 4,760,909 | 8/1988 | Dudley et al. | 209/643 X |

Primary Examiner—Michael S. Huppert
Assistant Examiner—Edward M. Wacyra
Attorney, Agent, or Firm—Litman, McMahon & Brown

[57] ABSTRACT

A conveyed item divider apparatus and method for automatically dividing a mixture of a plurality of first items and a plurality of second items into a first group containing only the first items and a second group containing only the second items. The apparatus includes a first conveyor conveying the mixture of items along a common path beneath an overlying second conveyor containing a negative pressure chamber. Each of the containers is suctioned in abutting relationship with the second conveyor. A shutter mechanism selectively releases each of the second containers to the first conveyor where they are urged laterally to follow a second path along the first conveyor. Each of the first containers is subsequently returned to the first conveyor to follow a first path along the first conveyor which is substantially colinear with the common path and is separate from the second path.

12 Claims, 5 Drawing Sheets

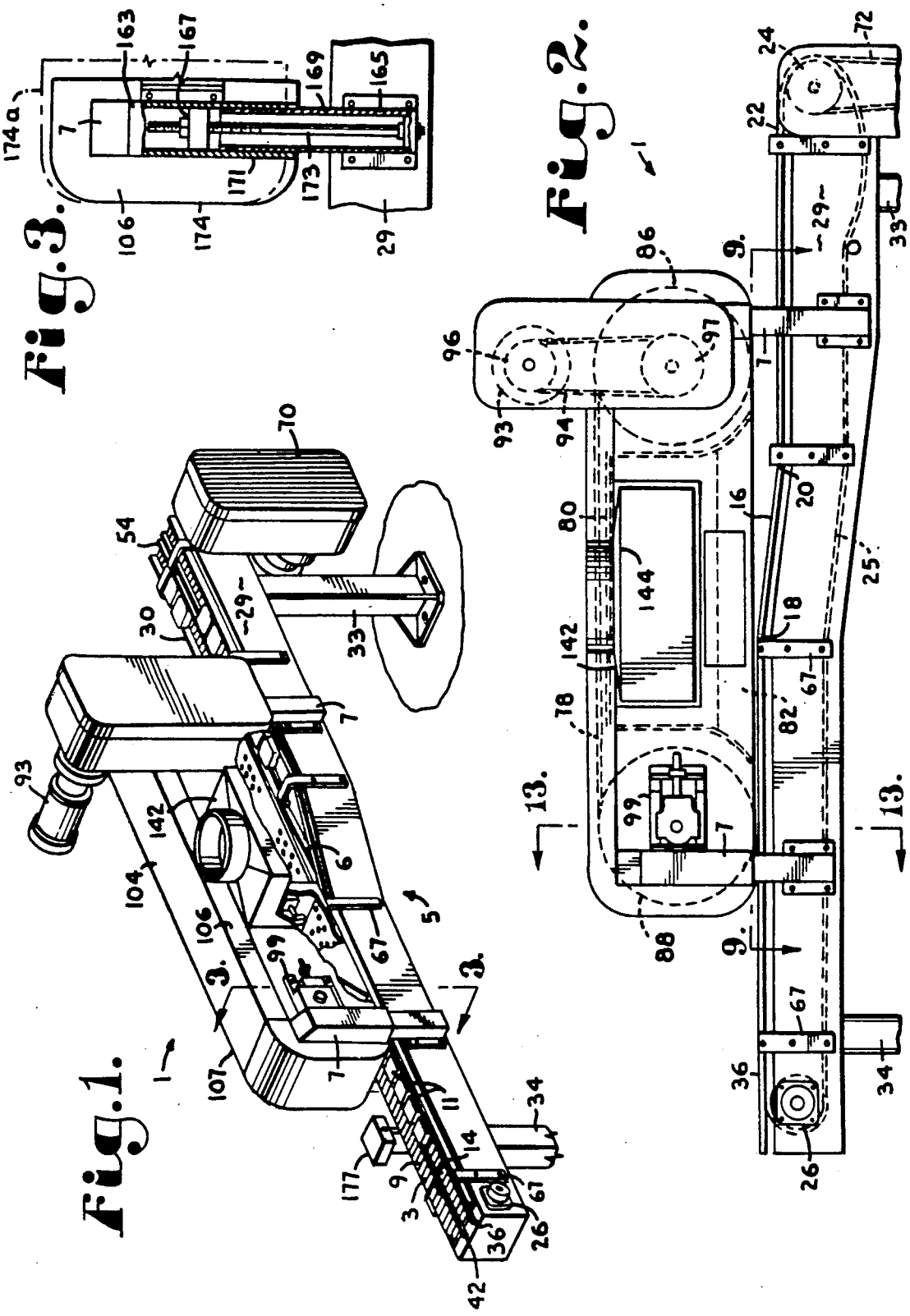

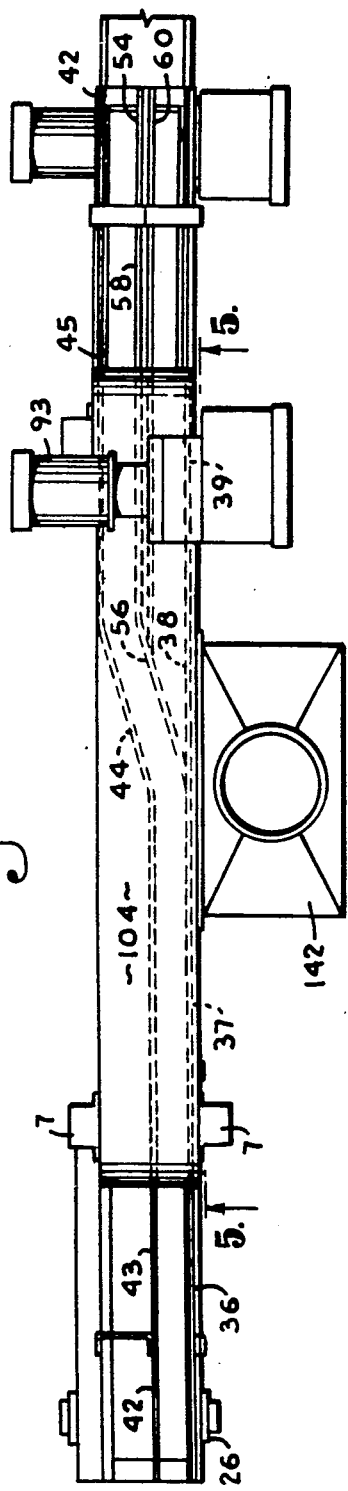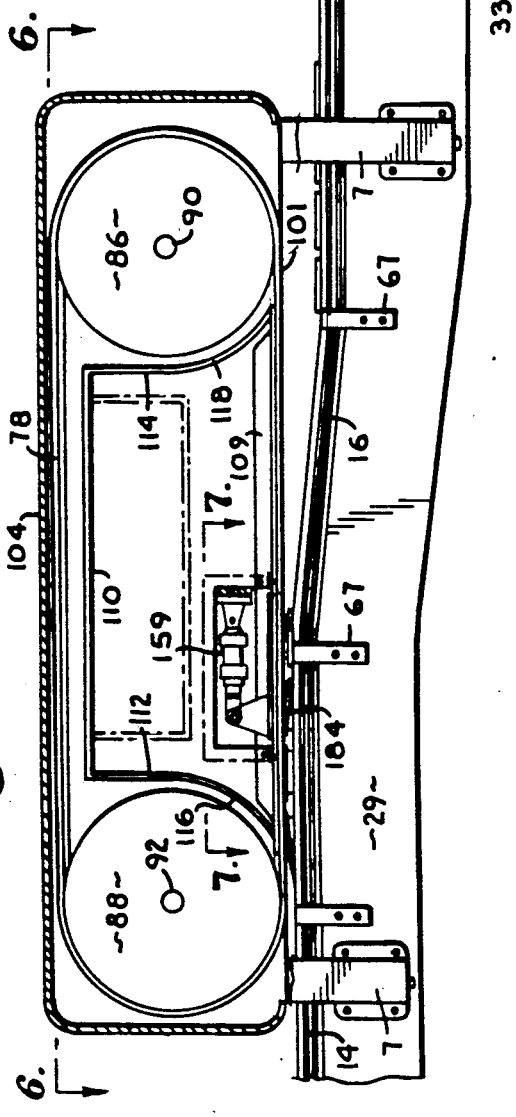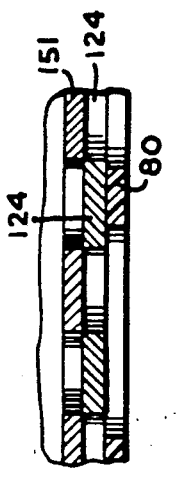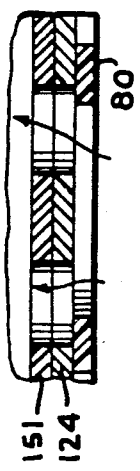

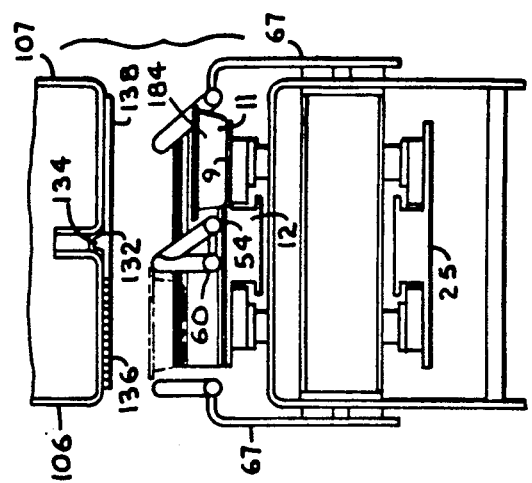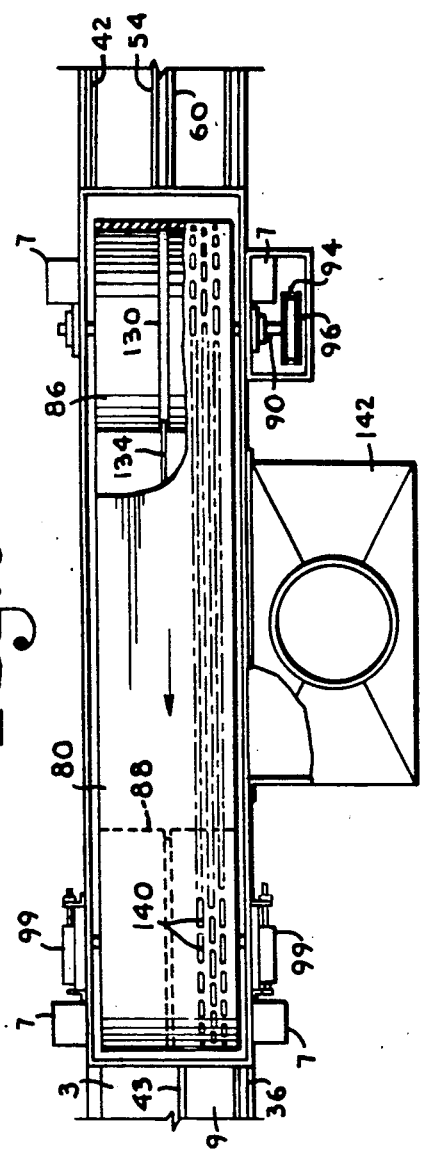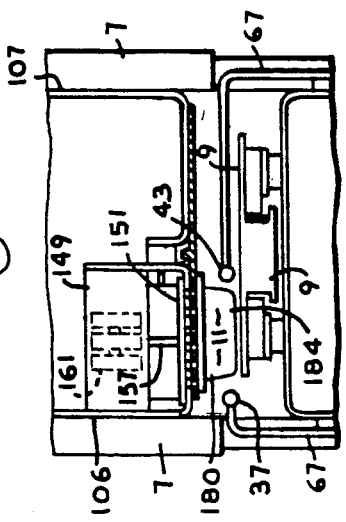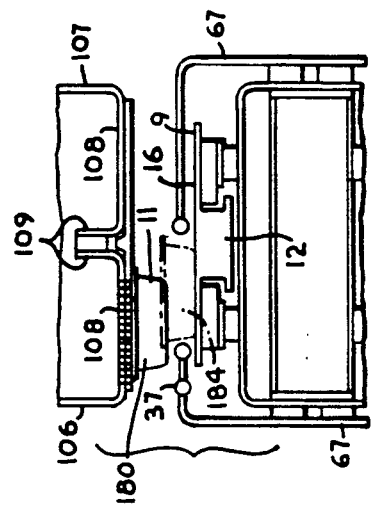

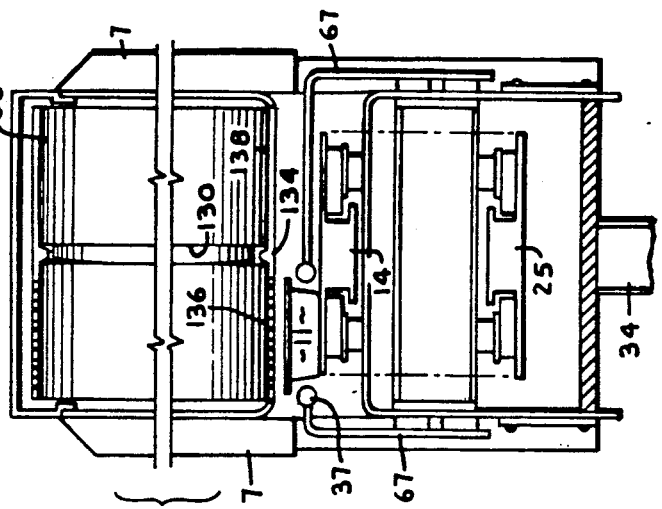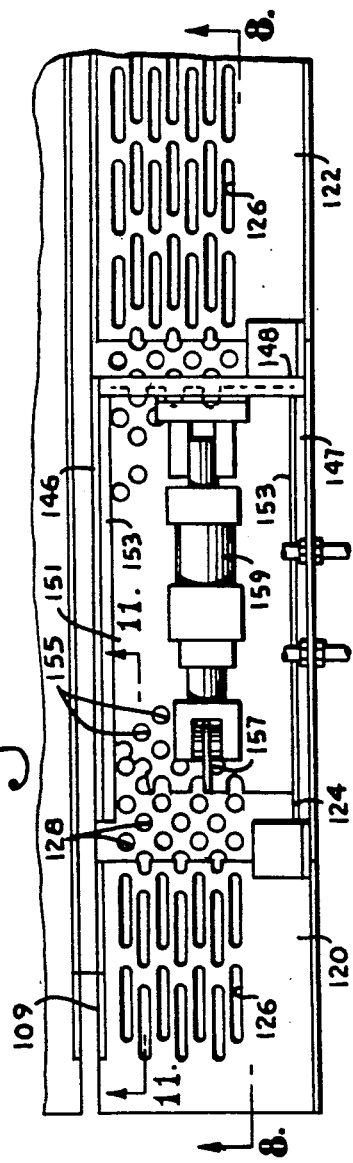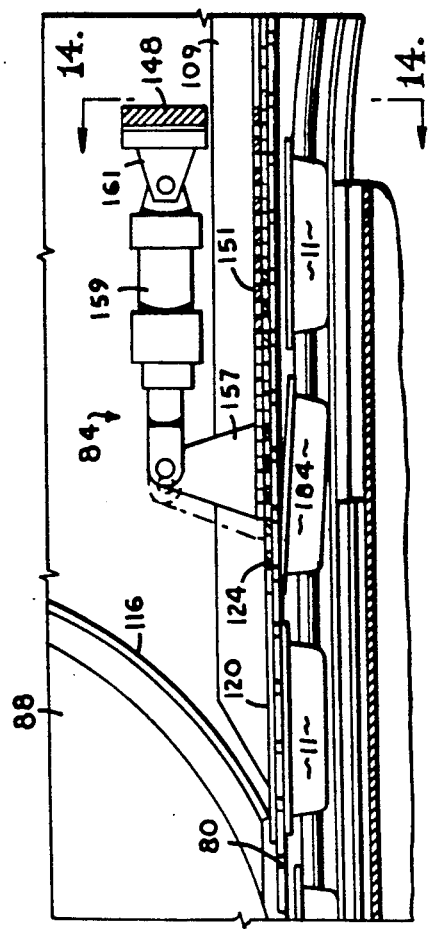

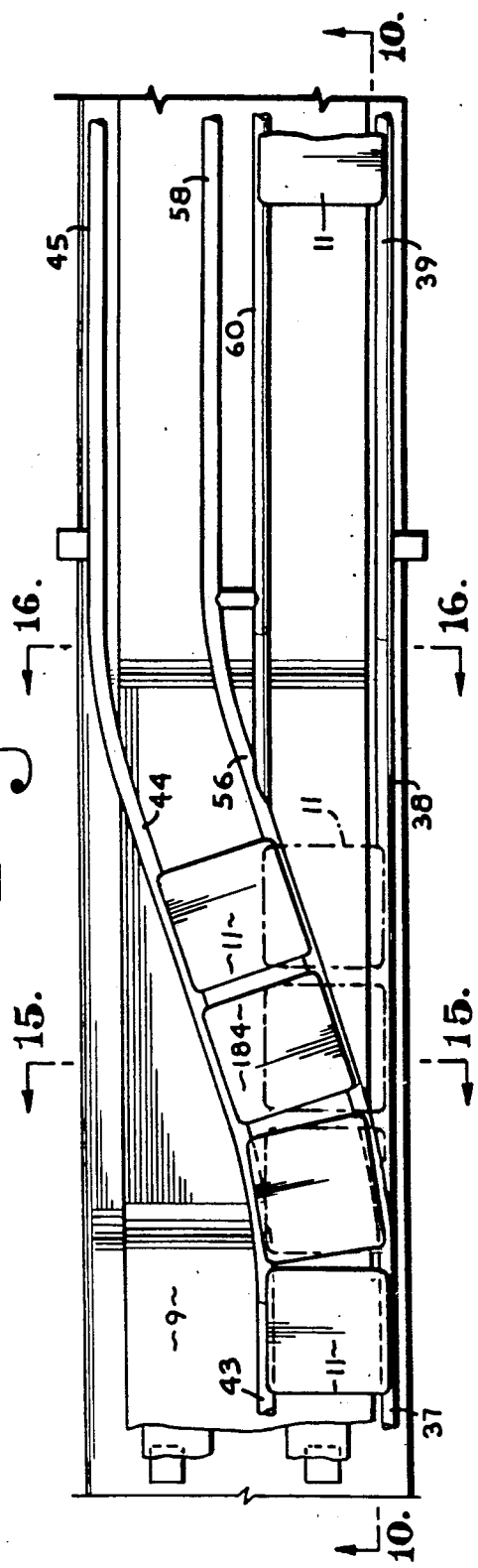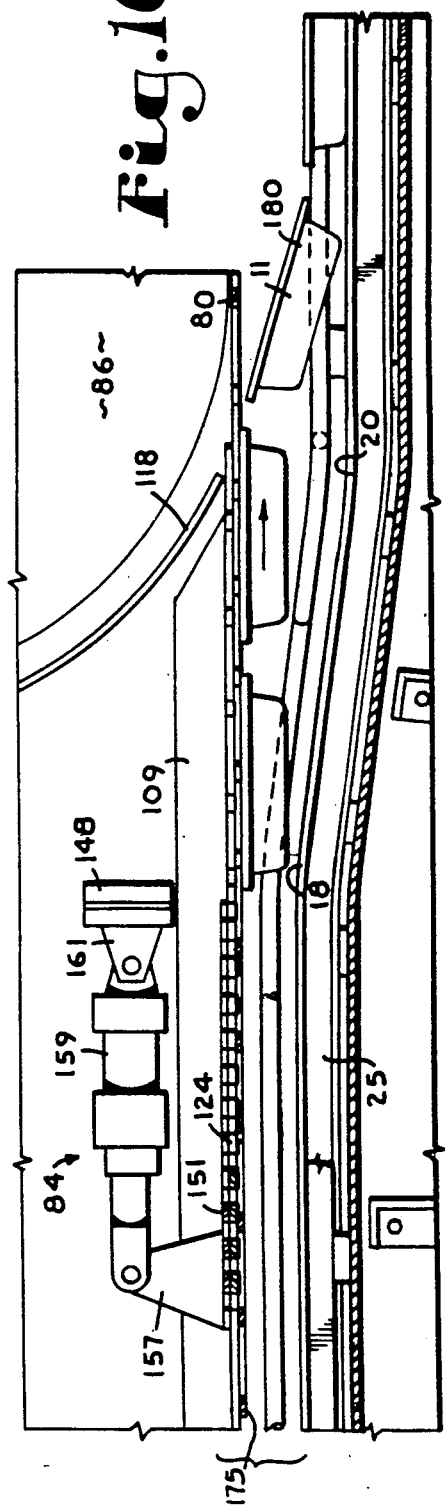

CONVEYED ITEM DIVIDER/SORTER

BACKGROUND OF THE INVENTION

1. Field of the Invention

The present invention relates generally to an apparatus and method to be used for continuously sorting or dividing items while such items are conveyed along a conveyor and, more particularly, to an apparatus and a method for sorting a mixture of two types of items into two groups with one group containing only one type of item and the other group containing only the other type of item, or dividing similar items into sequential groups with one group receiving one disposition and the next group receiving another disposition.

2. Background of the Relevant Art

In many manufacturing processes where conveyors are utilized to transport items from one station to another station, it is many times beneficial to intermix similar but detectably different items on the same conveyor. Such detectable difference in the items may be distinguishing labeling, variation in a physical attribute, such as shape, weight, color, etc., or a multitude of other detectably distinguishing attributes.

Various other apparatus in the prior art have used adaptations such as pushers to eject undesirable or unwanted items from the path of movement. Such an approach is not always desirable in those situations where the primary purpose is to physically sort one type of item from another type of item.

What is needed is a conveying system whereby intermixed items having detectable variations in characteristics can be automatically sorted and separately conveyed for further disposition whereby each item receives preferential handling treatment. What is further needed is a conveying system which can also function to batch process similar items for alternative downstream distribution.

SUMMARY OF THE INVENTION

A conveyed item divider/sorter apparatus is provided to either feed items, containers, packages or the like having detectable distinguishing characteristics or substantially similar such items, etc., for batch processing and alternative distribution. The apparatus includes a detector system for either determining which of the containers are of one type and which of the containers are of another type or allocating a certain number of items to each sequential batch, and a conveyor belt having a common path for conveying such containers beneath and in close proximity to an endless vacuum belt.

As each of the containers passes under the vacuum belt, which serves as a negative pressure sorter, they are suctioned into an abutting relationship with the vacuum belt. The vacuum belt then transports the containers beneath a shuttering assembly.

When the apparatus is functioning as a sorter, if the detector has determined that a particular container is of one particular type, then the shutter assumes an open configuration such that the container continues in abutting relationship with the vacuum belt and is subsequently returned to the conveyor belt without lateral displacement from the common path.

If the detector has determined that a particular container is of a second particular type, then the shutter assumes a closed configuration such that the container terminates its abutting relationship with the vacuum belt and the container is released to the underlying conveyor belt where a diverting rail interferes with the container's forward motion, urging it laterally such that it follows a different path along the conveyor. As a result, the second type of container is effectively sorted from the first type of container.

When the apparatus is functioning as a divider, the detector is used as a counter such that a desired number of items is distributed along one of the paths. Then, the shutter assumes its other configuration and the desired number of items is then distributed along the other path.

PRINCIPAL OBJECTS OF THE INVENTION

Therefore, the principal objects of the present invention are: to provide an apparatus and a method for automatically sorting two or more types of items being commonly conveyed along a conveyor; to provide such an apparatus and a method which also automatically divides similar items into sequential batches; to provide such an apparatus which provides preferential treatment to all such items; to provide such an apparatus and a method which is mechanically simple in design and function; to provide such an apparatus and a method which is reliable in operation; to provide such an apparatus which is economical to manufacture, efficient in operation, capable of a long operating life and particularly well adapted for the proposed use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective and fragmentary view of a conveyed item divider/sorter apparatus, with portions cut away to show details thereof, in accordance with the present invention.

FIG. 2 is an enlarged and fragmentary side elevational view of the apparatus.

FIG. 3 is an enlarged and fragmentary side elevational view of an elevator of the apparatus taken along line 3—3 of FIG. 1, with portions cut away to show details thereof.

FIG. 4 is an enlarged top plan view of the apparatus.

FIG. 5 is an enlarged and fragmentary cross-sectional view of the apparatus taken along line 5—5 of FIG. 4.

FIG. 6 is an enlarged and fragmentary top plan view of the apparatus, taken along line 6—6 of FIG. 5, with portions cut away to show details thereof.

FIG. 7 is an enlarged and fragmentary cross-sectional view of the apparatus taken along line 7—7 of FIG. 5.

FIG. 8 is an enlarged and fragmentary cross-sectional view of a shutter of the apparatus taken along line 8—8 of FIG. 7.

FIG. 9 is an enlarged and fragmentary top plan view of the apparatus taken along line 9—9 of FIG. 2.

FIG. 10 is an enlarged and fragmentary vertical cross-sectional view of the apparatus taken along line 10—10 of FIG. 9.

FIG. 11 is an enlarged and fragmentary vertical cross-sectional view of the shutter of the apparatus in a closed configuration taken along line 11—11 of FIG. 7.

FIG. 12 is an enlarged and fragmentary vertical cross-sectional view of the shutter of the apparatus, similar to that of FIG. 11 but with the shutter in an open configuration.

FIG. 13 is an enlarged and fragmentary cross-sectional view of the apparatus, taken along line 13—13 of FIG. 2.

FIG. 14 is an enlarged and fragmentary cross-sectional view of the apparatus, taken along line 14—14 of FIG. 8.

FIG. 15 is an enlarged and fragmentary cross-sectional view of the apparatus, taken along line 15—15 of FIG. 9.

FIG. 16 is an enlarged and fragmentary cross-sectional view of the apparatus, taken along line 16—16 of FIG. 9.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a conveyed item divider/sorter apparatus in accordance with the present invention. The apparatus 1 comprises conveyor means such as a first conveyor 3, sorting means such as negative pressure divider/sorter 5, diverting means such as a diverter rail 6, and elevating means such as a plurality of elevators or threaded rod assemblies 7, all as shown in FIG. 1.

The conveyor 3 comprises a continuous substantially flexible platform 9 which conveys items, packages, or containers 11, or the like, therealong. The platform 9 has an upper portion 12 comprising an upstream portion 14 which is oriented substantially horizontally, a transition portion 16 having an upper end 18 and a lower end 20 such that the transition portion 16 depends somewhat downwardly from the upstream portion 14, and a downstream portion 22 which is oriented substantially horizontally from the lower end 20 of the transition portion 16. The platform 9 cascades downwardly over a drive roller 24. A return portion 25 is entrained around an idler roller 26, as shown in FIG. 2.

The rollers 24 and 26 and the remaining portions of the apparatus 1 as herein described are interconnected by frame means, such as sides 29 and 30, supporting posts 33 and 34, and crossmembers (not shown) secured therebetween, as commonly used in the industry.

A first rail 36, having an upstream segment 37, a transition segment 38, and a downstream segment 39, runs substantially along one side of the upper portion 12 of the conveyor platform 9 and is contoured such that it is spaced above and substantially parallel to each of the planes of the belt upstream portion 14, transition portion 16 and downstream portion 22 lying immediately therebelow, as shown in FIG. 4.

A second rail 42, having an upstream segment 43, a transition segment 44, and a downstream segment 45, is similarly situated such that it is substantially parallel to each of the planes of the belt upstream portion 14, transition portion 16 and downstream portion 22 lying immediately therebelow, as shown in FIG. 4. The second rail upstream segment 43 is spaced substantially parallel to the first rail upstream segment 37, with the spacing therebetween being greater than the lateral dimensions of the containers 11 being conveyed along the platform 9. The second rail transition segment 44, which lies immediately above the belt transition portion 16, substantially extends from near the transition portion upper end 18 to the transition portion lower end 20. The second rail transition segment 44 extends transversely away from the first rail transition segment 38 such that the second rail downstream segment 45 is spaced substantially near the side of the platform 9 opposite from the side of the platform 9 which lies substantially near the first rail 36, as shown in FIG. 4.

A transition rail 54 has a transition segment 56 and a downstream segment 58 such that the transition segment 56 is substantially parallel to the second rail transition segment 44. The downstream segment 58 is substantially parallel to the second rail downstream segment 45. The spacing between the second rail transition segment 44 and the transition segment 56 is substantially equal to the spacing between the first rail upstream segment 37 and the second rail upstream segment 43. Similarly, the spacing between the downstream segment 58 and the second rail downstream segment 45 is substantially equal to the spacing between the first rail upstream segment 37 and the second rail upstream segment 43.

A continuation rail 60 is spaced immediately above the belt downstream portion 22 and is substantially spaced parallel to and laterally from the first rail downstream segment 39 a distance approximately equal to the spacing between the first rail upstream segment 37 and the second rail upstream segment 43. The continuation rail 60 extends from near the belt transition portion lower end 20 to near the downstream end of the belt upper portion 12, as shown in FIG. 4.

A plurality of brackets 67 are rigidly secured to the frame means, such as the sides 29 and 30, and are configured and rigidly secured to the first rail 36, the second rail 42, the transition rail 54, and the continuation rail 60 such that each of the first rail 36, the second rail 42, the transition rail 54, and the continuation rail 60 are appropriately spaced relative to each other and to the various contours of the belt upper portion 12. The first rail 36, the second rail 42, the transition rail 54, and the continuation rail 60 are suspended immediately above the belt 10 such that they do not interfere with the movement of the belt upper portion 12.

The platform 9 is driven by motor means, such as a motor 70, which is appropriately connected to the drive roller 24 with a drive belt 72.

The negative pressure divider/sorter 5 comprises a second conveyor 78 having an endless vacuum belt 80, a vacuum chamber 82 and a shutter assembly 84. The vacuum belt 80 is entrained around a drive roller 86 and an idler roller 88. The drive roller 86 is rotatably mounted on a substantially horizontally oriented axle 90 and the idler roller 88 is similarly rotatably mounted on a substantially horizontally oriented axle 92 which is substantially parallel to the axle 90. The second conveyor 78 is driven by motor means, such as a motor 93 connected to the drive roller 86 by a belt 94 and appropriately sized pulleys, 96 and 97, to provide the desired velocity for the vacuum belt 80. The axle 92 is mounted with a pair of tensioning mechanisms 99 such that the axle 92 can be spaced toward or away from the axle 90 in order to tension the belt 80 as desired.

A lower run 101 of the vacuum belt 80 is spaced above and substantially parallel to the upstream belt portion 14, as hereinafter described.

The belt 80 and the rollers 86 and 88 are enclosed within a cowling 104. The cowling 104 has substantially vertically oriented side walls 106 and 107, a bottom wall 108, and a guide 109.

The vacuum chamber 82 has a top wall 110 and a pair of end walls 112 and 114. The top wall 110 is rigidly secured to the end walls 112 and 114. The top wall 110 and the end walls 112 and 114 are rigidly secured to the cowling side walls 106 and 107 substantially forming airtight seals therewith.

A lower portion 116 of the end wall 112 has an arcuate configuration which is substantially concentric with the center of the axle 92. Similarly, a lower portion 118 of the end wall 114 has an arcuate configuration which is substantially concentric with the center of the axle 90.

The guide 109 is spaced substantially parallel to the two side walls 106 and 107 and approximately mid-way therebetween. The guide 109 extends from close proximity to the lower portion 116 of the end wall 112 to close proximity to the lower portion 118 of the end wall 114. The cowling bottom wall 108 has an upstream portion 120 and a downstream portion 122, as shown in FIG. 7.

The upstream portion 120 extends from close proximity to the idler roller 88 to a shutter plate 124 which forms a bottom wall of the shutter assembly 84 as hereinafter described. The upstream portion 120 is spaced such that it forms an airtight seal with the end wall lower portion 116 while substantially abutting against the vacuum belt 80, as shown in FIG. 5.

The cowling bottom wall downstream portion 122 extends from the shutter plate 124 to close proximity to the drive roller 86. The cowling bottom wall downstream portion 122 is spaced such that it forms an airtight seal with the end wall bottom portion 118 while substantially abutting against the vacuum belt 80, as shown in FIG. 5.

The upstream portion 120 and the downstream portion 122 are each constructed with through slots 126 between the side wall 106 and the guide 109 as shown in FIG. 7. The shutter plate 124 abuts and is substantially coplanar with the upstream portion 120 and the downstream portion 122. The shutter plate 124 contains a plurality of throughbores 128 which are spaced substantially colinearly with the slots 126. In one application of the present invention, the bores 128 are one-half inch diameter and are spaced on one-inch centers in a staggered array, and the slots 126 are approximately two and three-fourths inches long by five-sixteenths inch wide spaced laterally on one-half inch centers, as shown in FIG. 7.

The rollers 86 and 88 are contoured with a groove 130 as shown in FIG. 13. Similarly, the cowling bottom wall 108 is configured with a groove 132 as shown in FIG. 16. The vacuum belt 80 has an integral rib 134 which tracks the roller grooves 130 and the cowling bottom wall groove 132. The rib 134 effectively partitions the vacuum belt 80 into a transporting portion 136 and a non-transporting portion 138. The transporting portion 136 travels along and in abutting relationship with the bottom wall portions 120 and 122 containing the slots 126 and with the portion of the shutter plate 124 which is coplanar with the bottom wall portions 120 and 122. The transporting portion 136 contains through-slots 140, as shown in FIG. 6. The slots 140 are sized and spaced substantially similarly to the slots 126 in the cowling bottom wall portions 120 and 122. The center lines of the slots 140 are substantially aligned with the center lines of the slots 126 when abutting thereagainst. The non-transporting portion 138 is substantially impervious to airflow.

A duct 142 connects a vacuum source (not shown) to the vacuum or negative pressure chamber 82 through an opening 144 in the cowling side wall 106.

The shutter plate 124 is rigidly secured to shutter frame sides 146 and 147, and a shutter frame end 149 is rigidly secured between the shutter frame sides 146 and 147, as shown in FIG. 7. A shutter 151 is juxtaposed above the shutter plate 124. A pair of guides 153, which are rigidly secured to shutter frame sides 146 and 147, space the shutter 151 in slidable abutting relationship with the shutter plate 124.

The shutter 151 has a plurality of throughbores 155 which are dimensioned and spaced substantially similar to the through bores 128 in the shutter plate 124. The shutter 151 is rigidly secured to an upstanding shutter bracket 157, as shown in FIG. 8. The shutter bracket 157 is pivotally secured to a rod and piston 159 which, in turn, is pivotally secured to a clevis 161. The clevis 161 is rigidly secured to the shutter frame end 149.

The rod and piston 159 has substantially two preferred positions or configurations with the first such configuration, sometimes hereinafter referred to as an open configuration, whereat the bores 155 are substantially aligned with the bores 128, as shown in FIG. 12, and a second such configuration, sometimes hereinafter referred to as a closed configuration, whereat the bores 155 are substantially misaligned with the bores 128, as shown in FIGS. 7, 8, and 11.

Each of the threaded rod assemblies 7 comprises an upper end 163, which is rigidly secured to one of the cowling side walls 106 or 107, and a bottom end 165 which is rigidly secured to one of the frame sides 29 or 30. A threaded block 167 is rigidly secured to the upper end 163. The lower end 165 has an upstanding extension 169 which is dimensioned to telescope within an extension 171 of the upper end 163. A threaded rod 173 is pivotally connected to the lower end 165 and threadedly secured to the block 167 such that relative spacing between the upper end 163 and the lower end 165 can be adjusted by manipulating the threaded rod 173. The various threaded rod assemblies 7 can be cooperatively adjusted to provide the desired spacing between a lower run 175 of the vacuum belt 80 and the conveyor platform 9. For example, in FIG. 3, solid lines referenced by 174 indicate a representative spacing between the cowling side 106 and the frame side 29 prior to adjustment of the threaded rod assembly 7 and the dotted lines referenced by 174a indicate a corresponding spacing after adjustment of the threaded rod assembly 7.

In an actual application of the present invention, the threaded rod assemblies 7 are adjusted such that the spacing between the lower vacuum belt run 175 and the first conveyor upstream portion 14 is dimensioned relative to a vertical dimension of the containers 11 such that the suction created by the negative pressure developed in the negative pressure chamber 82 can attract and hold each of the containers 11 against the vacuum belt 80. The spacing between the lower vacuum belt run 175 and the conveyor upstream portion 14 is further dimensioned such that the elevation of the lower extremities of each of the containers 11 while held against the vacuum belt 80 is sufficient for the containers 11 to pass above the transition rail as the vacuum belt 80 transports such uplifted containers 11 therealong.

For discussion purposes, the region along the vacuum belt 80 bordered upstream by the upstream end of the slots 126 of the cowling bottom wall upstream portion 120 and bordered downstream by the upstream end of the shutter plate 124 shall sometimes hereinafter be referred to as zone I. Similarly, the region bordered upstream by the upstream end of shutter plate 124 and bordered downstream by the downstream end of the shutter plate 124 shall sometimes hereinafter be referred to as zone II, the region bordered upstream by the downstream end of the shutter plate 124 and bordered downstream by the transition portion lower end 20, shall sometimes hereinafter be referred to as zone III, and the region bordered upstream by the downstream end of the slots 126 of the cowling bottom wall downstream portion 122, shall sometimes hereinafter be referred to as zone IV.

For discussion purposes, the use of the apparatus 1 as a sorter will be first described, followed by a discussion of the use of the apparatus 1 as a divider.

As the containers 11 are conveyed along the conveyor upstream portion 14, a part of what is sometimes referred to herein as a common path, a detector 177 determines which of the containers 11 are of one type which are to be sorted from the remaining containers 11 which are of another type. Each of the containers 11 then passes under the vacuum belt 80, as shown in FIG. 13. The containers 11 then pass into zone I, where each of the containers 11, such as the container referenced by the numeral 180 as shown in FIG. 14, is suctioned into an abutting relationship with the vacuum belt 80. Just prior to the transporting of the container 180 from zone I to zone II, the detector communicates with the shutter assembly 84 such that the shutter 151 will assume its open configuration if the container 180 is of one type to be sorted and such that the shutter 151 will assume its closed configuration if the container 180 is of the other type.

Assume for the purposes of discussion that a particular characteristic of the container 180 has been detected such that the shutter 151 assumes its open configuration. In that event, as the container 180 passes from zone I into zone II, the bores in the shutter frame 124 are substantially in communication with the bores 155 in the shutter 151. As a result, the suctioning relationship is maintained between the container 180 and the vacuum belt 80, and the container 180 continues along and in abutting relationship with the belt 80, as shown in FIG. 15. As the container 180 moves into zone IV, the suctioning relationship between the container 180 and the vacuum belt 80 is terminated with the result that the container 180 drops to the downstream belt portion 22 between the first rail downstream segment 39 and the continuation rail 60, as shown in FIG. 10, a part of which is sometimes referred to herein as a first path. The containers 11 reaching the downstream belt portion 22 continue therealong to the downstream end of the conveyor platform 9 for further disposition, such as transfer to another conveyor 182, as shown in FIG. 5.

Similarly, assume that one of the containers 11, such as that referenced by the numeral 184 in FIG. 14, has a detectable characteristic which causes the shutter 151 to assume its closed configuration. Then, as the container 184 passes from zone I into zone II, the suctioning relationship between the vacuum belt 180 and the container 184 is terminated and the container 184 drops back to the upstream belt portion 14, as shown in FIG. 5. As the container 184 moves therealong in frictional engagement with the conveyor platform 9, the transition segment 56, in zone III, slidingly urges the container 184 transversely, as shown in FIG. 9, along a part of what is sometimes referred to herein as a second path. Such transverse urging is continued until the container 184 is diverted laterally to a spacing between the second rail downstream segment 45 and the transition rail downstream segment 58. The container 184 is then effectively sorted from the container 180 and is transported to the downstream end of the conveyor platform 9 for further disposition.

It is to be understood that the present invention is not limited to the sorting of only two types of detectable discriminating characteristics, but can be adapted to automatically sort more than two types of containers having differing detectable discriminating characteristics by providing additional shuttering and path arrangements through the apparatus.

When the apparatus 1 is used as a divider, the detector 177 can serve as a counter. In that event, after a desired quantity of containers 11 have been transported through Zone II with the shutter 151 is either its closed or open configuration and the containers 11 are distributed down one of the paths, either the first path or the second path as hereinbefore described, the detector 177 then communicates with the shutter assembly 84 such that the shutter 151 assumes its other configuration and the containers 11 are then distributed down the other path. When used as a divider, the control circuitry (not shown) connected between the detector 177 and the shutter 151 can be programmed to provide a preselected quantity for each sequential batch or, alternatively, a control signal can be arbitrarily generated downstream to divert items to or away from one or the other of the two paths to provide item demand or prevent item overflow downstream as desired.

It is to be understood that while certain forms of the present invention have been illustrated and described herein, it is not to be limited to the specific forms or arrangements of parts described and shown.

What is claimed and desired to be secured by Letters Patent is as follows:

1. An apparatus for handling items comprising first items and second items, comprising:
   (a) conveying means having a common path, a first path at least partially colinear with said common path, and a second path diverging from said common path for conveying said items;
   (b) transport means superimposed above said conveying means;
   (c) negative pressure means for selecting said first and said second items from said common path to an abutting relationship with said transport means;
   (d) control means having a first configuration for de-selecting said first items to said first path of said conveying means and a second configuration for de-selecting said second items to said second path of said conveying means; and
   (e) shunting means for cooperatively urging said second items along said second path.

2. The apparatus according to claim 1 wherein said control means includes:
   (a) a detector; and (b) releasing means in communication with said detector for releasing said second items to said second path while retaining said first items in abutting relationship with said transport means.

3. The apparatus according to claim 2 wherein:
(a) said detector distinguishes between a characteristic of said first items which differs from that of said second items.

4. The apparatus according to claim 3 wherein said releasing means includes:
(a) a shutter having a first position wherein said abutting relationship between said first items and said transport means is substantially maintained therebelow and a second position wherein said abutting relationship between said second items and said transport means is not maintained therebelow.

5. The apparatus according to claim 2 wherein:
(a) said detector counts said first and said second items conveyed by said conveying means.

6. The apparatus according to claim 2 wherein:
(a) said control means can be remotely changed from one configuration to the other configuration.

7. The apparatus according to claim 2 wherein said transport means includes:
(a) a perforated conveyor belt; and
(b) a negative pressure chamber having a perforated wall adapted to cooperate with said perforated conveyor belt.

8. The apparatus according to claim 1 wherein said shunting means includes:
(a) a diverting rail for slidably urging said second items along said second path.

9. The apparatus according to claim 1 including:
(a) elevating means for adjusting the spacing between said conveying means and said transport means.

10. An apparatus for sorting a mixture comprising first containers and second containers into a first group comprising only said first containers and a second group comprising only said second containers, comprising:
(a) a first endless conveyor for conveying said first containers and said second containers therealong;
(b) a plurality of rails for dividing an upper surface of said first conveyor into:
(1) a common path;
(2) a first path substantially colinear with said common path; and
(3) a second path spaced laterally from said first path;
(c) a detector mechanism for discriminating between said first containers and said second containers;
(d) a pair of wall portions having through-slots;
(e) a shutter plate having throughbores; said shutter plate substantially co-planar with and imposed between said pair of wall portions; said shutter plate bores substantially co-linear with said slots in said pair of wall portions;
(f) a second endless conveyor having a slotted belt; said second conveyor cooperatively superimposed above said first conveyor; said slotted conveyor belt cooperatively aligned with said slots of said pair of wall portions and with said bores of said shutter plate;
(g) a negative pressure chamber having a wall substantially comprising said pair of said wall portions and said shutter plate;
(h) a shutter having throughbores substantially sized and spaced similarly to said bores of said shutter plate; said shutter slidably mounted in cooperative abutting relationship with said shutter plate;
(i) a rod and piston mechanism pivotally connected to said shutter; said rod and piston mechanism having a first configuration such that said bores of said shutter are substantially aligned with said bores of said shutter plate and a second configuration such that said bores of said shutter are substantially misaligned with said bores of said shutter plate; said rod and piston mechanism in cooperative communication with said detector mechanism such that said shutter assumes said first configuration when one of said first containers passes therebeneath and said shutter assumes said second configuration when one of said second containers passes therebeneath; and
(j) a diverting rail for slidably urging said second containers from said common path to said second path.

11. A method for handling items comprising first items and second items, comprising the steps of:
(a) conveying said first and said second items along a common path of a first conveyor;
(b) removing all said items from said first conveyor by releasable negative pressure securement to a second superimposed conveyor;
(c) selectively releasing said second items to a second path diverging from said common path of said first conveyor; and
(d) subsequently releasing said first items to a first path at least partially colinear with said common path of said first conveyor.

12. A method for automatically separating a plurality of first containers from a plurality of second containers, comprising the steps of:
(a) conveying said first containers and said second containers along a first conveyor;
(b) using a detector mechanism to discriminate between said first containers and said second containers;
(c) conveying along a common path said first and said second containers beneath a negative pressure chamber;
(d) removing said first and said second containers from said first conveyor with negative pressure provided by said negative pressure chamber such that said first and said second containers are spaced in abutting relationship with a superimposed second conveyor which provides continuing forward movement of said containers;
(e) coordinatingly controlling a shutter in communication with said detector mechanism such that said negative pressure is selectively terminated above said second containers such that said second containers are released to a second path diverging from said common path upon said first conveyor;
(f) cooperatively laterally urging said second containers toward said second path along said first conveyor with a diverting rail; and
(g) subsequently terminating the negative pressure above said first containers such that said first containers are released to a first path at least partially colinear with said common path upon said first conveyor.

* * * * *